Apr. 3, 1923.
G. THOMAS
FOLDING PUSH CAR
Filed Dec. 27, 1921
1,450,193
2 sheets-sheet 2
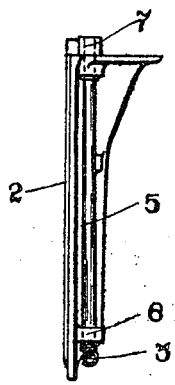
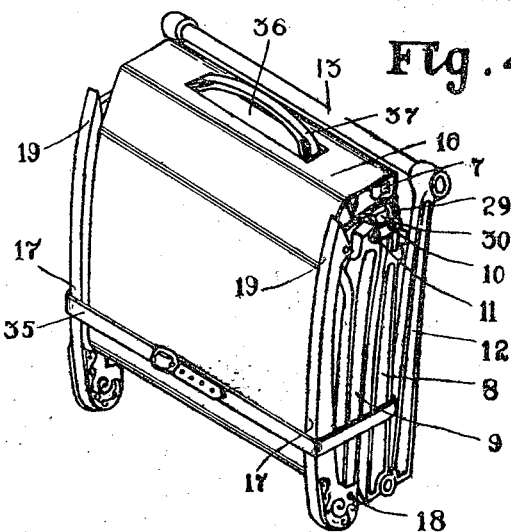
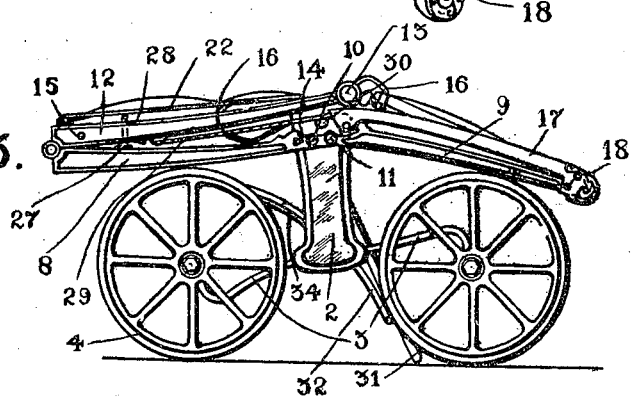
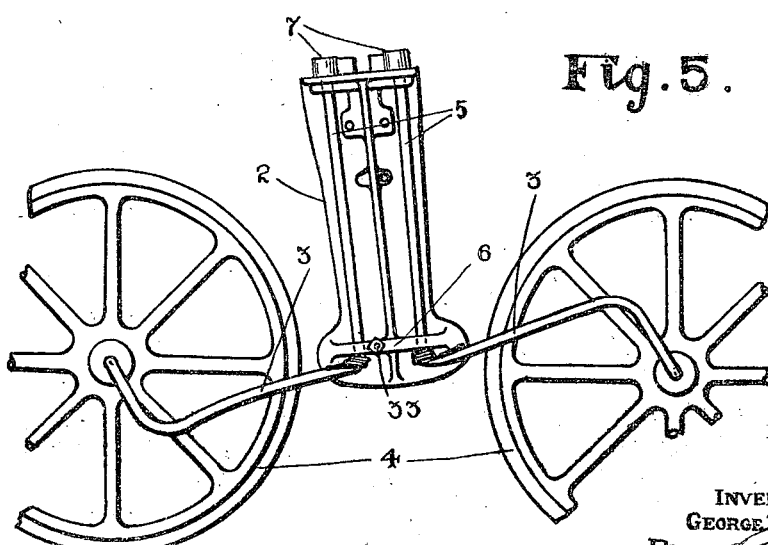
INVENTOR
GEORGE THOMAS
PER~ Rayworth
ATTORNEYS Patented Apr. 3, 1923.

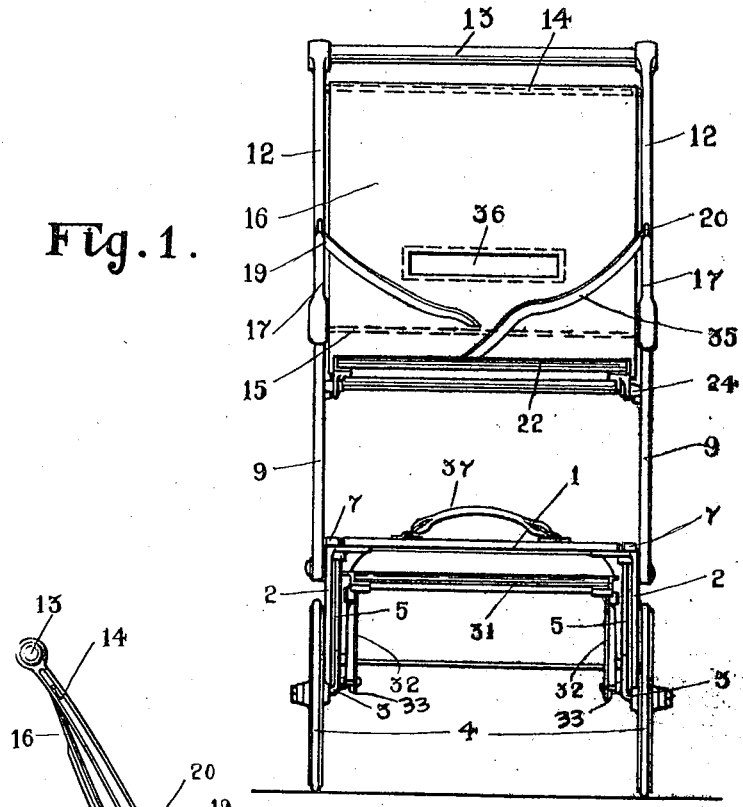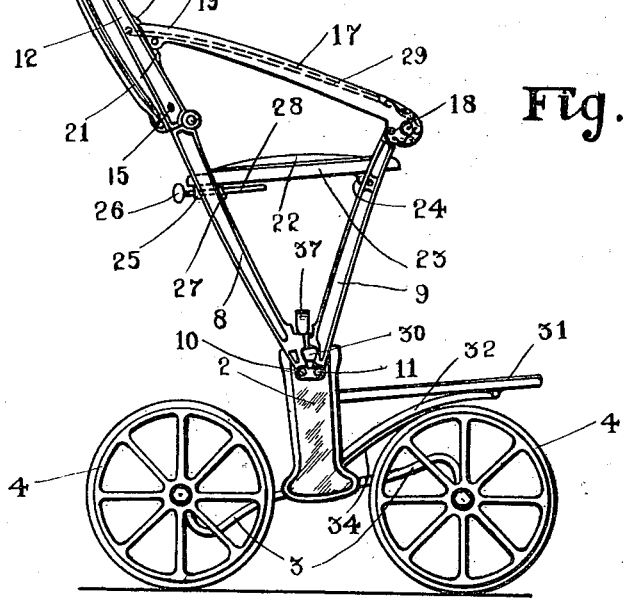

1,450,193

UNITED STATES PATENT OFFICE.

GEORGE THOMAS, OF CHELSEA, ENGLAND.

FOLDING PUSH CAR.

Application filed December 27, 1921. Serial No. 525,187.

*To all whom it may concern:*

Be it known that I, GEORGE THOMAS, subject of the King of Great Britain and Ireland, residing at 46 Gunter Grove, Chelsea, in the county of London, England, have invented certain new and useful Improvements in Folding Push Cars, of which the following is a specification.

My invention relates to an improved construction and arrangement of folding push car of the type employed for wheeling children about and the object of my invention is to provide a simple and compact form of car which when folded will closely resemble a suit case, and which may be readily carried when so folded, and is capable of being quickly opened for use. When the push car is folded up the wheels and attached parts are completely covered and enclosed so as to prevent the possibility of them coming into contact with the clothes of the person carrying the same, or third party.

According to this invention I employ a bridge-shaped frame member which forms the base of the structure of the folding push car, and on this bridge shaped frame member are mounted the axle brackets for the wheels, which axle brackets are adapted to turn about vertical pivots, to bring them into the closed or opened position. When these axle brackets are turned into the open position, the wheels mounted thereon face in a fore and aft direction, but when turned into the closed position the wheels fold within the bridge shaped frame member and are enclosed by the back and seat of the push car when these are collapsed.

The axle brackets are provided with cams or catches which co-operate with the other portions of the frame, so as to lock the axle brackets in the open position when the chair is opened out and erected ready for use. Suitable toothed or other gearing may be used to interconnect the axle brackets and upper structure so that they will open and close simultaneously. The axle brackets may be made resilient or the wheels be resiliently mounted thereon so as to act as springs.

The back and front portions of the frame which support the seat are pivoted to the side of the bridge shaped frame, and when closed they fold down and lie flat against the sides thereof.

The material forming the back and seat of the frame which may conveniently be leather, cloth or other suitable flexible material, folds over the front and back of the bridge shaped frame member, and its other parts and encloses the wheels and axle brackets therein so as to protect the clothes of the user from mud or other dirt thereon.

When opened the side members of the push car project in an upward direction at divergent angles to form the back, arms and seat to support the leather or other flexible material. The frame members forming the back of the push car are formed in two pieces hinged together and adapted to fold over upon each other.

A pair of forwardly projecting members support the frame of the seat which is hinged between them and a pair of arms are hinged to the upper ends of these members and engage at their free ends against the top portion of the back of the frame. The seat is provided with projecting lugs at its back, which engage the other lugs on the back frame members, and suitable locking means are provided to connect these together, in such a manner as to hold the whole frame rigidly in the opened position.

The seat may be suitably padded and a cross rail or handle may be provided by means of which the push car may be wheeled when in the opened position. A suitable foot rest may be pivoted inside the bridge shaped frame member, and adapted to be turned into a suitable position for the child's feet to rest on when thus opened out for use.

The top of the bridge shaped frame member is provided with a suitable handle, by means of which the push car may be carried when folded. This handle is adapted to project through a slot in the material forming the back of the push car and supported between the back frame members.

Suitable springs may be arranged to cause the axle brackets and the wheels mounted thereon to automatically fold into the closed position when the rest of the frame of the push car is folded down, so as to release the locking device which firmly holds the axle brackets and wheels in the opened position. The bridge shaped frame member may be closed upon its lower side and suitable flaps or strips may be arranged to enclose the side members of the frame so as to cause the push car when folded to be completely enclosed, and thus increase its resemblance to a suit-case.

In order that my invention may be more readily understood reference is made to the accompanying sheet of illustrative drawings in which:

Figure 1 is a front elevation of a folding push car constructed according to my invention and shown in the opened position.

Figure 2 is a side elevation of the same.

Figure 3 is a side elevation of the push car partially collapsed and in the act of being folded up.

Figure 4 is a perspective view showing the push car completely folded and ready to be carried in the hand.

Figure 5 is a side elevation of a portion of the bridge shaped frame member showing in detail the method of mounting the axle brackets and wheels, and Figure 6 is a front elevation showing the mounting of the axle brackets.

Referring to the drawings the push car comprises the bridge shaped frame member 1, having downwardly depending sides 2. Upon these downwardly depending sides 2 are supported the axle brackets 3, two of which are arranged on each side of the bridge shaped frame 1. These axle brackets 3 each support a wheel 4, at their outer ends and are bent in an upward direction so as to form upright pivots 5 about which the axle brackets 3 may swing so as to enable the wheels 4 to be opened out fore and aft as shown in Figures 1, 2 and 3, or to be folded within the bridge shaped member 1, between its two sides 2 when the push car is collapsed.

These upright pivots 5 engage in bearings in brackets 6 near the lower ends of the sides 2 and in the upper cross member of the bridge shaped frame 1. Upon their upper ends are provided cams or catches 7 which are adapted to be engaged by other frame members of the push car, so as to lock the axle brackets 3 and wheels 4 in the open position when the push car is in use. To each side of the bridge shaped frame member 1 are hinged two frame members 8 and 9 each adapted to turn about pivots 10 and 11 respectively. These frame members 8 and 9 when opened out extend upwardly in divergent directions, as clearly shown in Figure 2. To the upper end of the frame members 8 are hinged the back frame members 12 connected together across their upper ends by means of the cross rail 13 which forms the handle by means of which the push car may be wheeled. Suitable cross bars or rods 14 and 15 extend between these side members 12 of the back of the push car and support a strip 16 of leather fabric or other suitable flexible material to form the back of the seat.

To the upper end of the forwardly projecting side members 9 are pivoted a pair of arms 17 of channel cross section by means of pivot pins 18 passing through their ends and the upper ends of the frame members 9. The free ends of these arms 18 butt against the side members 12 of the back of the push car, and engage beneath projecting stops 20. On these side members 12 projections 21 are also provided to engage within the channel ends 19 of the arms 17 thus locating them both in a vertical and lateral direction. The side members 8, 9 and 12 and the arms 17 are locked in the open position by means of the seat 22.

The seat 22 comprises a suitable wooden upper frame, having side strips 23 with downwardly projecting lugs 24, at their forward ends, which lugs 24 are pivoted to the forward side members 9. The rear ends of these metal strips 22 are provided with downwardly projecting lugs 25, in which are provided thumb screws 26 and these are adapted to engage behind projections 27 on the rear side members 8, which projections 27 may be connected together by means of a transverse connecting bar 28. When the thumb screws 26 are screwed up against the projections 27 they will tend to draw the two sets of side members 8 and 9 together, thus pressing the arms 17 against the projections 20 on the side members 12 of the back and clamping the parts rigidly together. A suitable elastic or other connection 29 is arranged within the channel shaped arms 17 and one end is connected to the arms near their forward ends, whilst the other end is connected to the side members 12 of the back of the push car. These elastic or flexible connections are held in slidable engagement in the ends 19 of the arms 17 and ensure the arms engaging readily in their correct position when the push car is opened out, and prevent them from hanging loose whilst it is being folded up.

Upon each side of the bridge shaped frame 1 near its upper end is provided a fixed stop or abutment 30 located above the pivots 10 and 11 so that this stop or abutment will engage between the lower ends of the pivoted side members 8 and 9. These abutments 30 serve to locate the side members 8 and 9 in their correct upright position when the push car is opened out for use.

Within the bridge shaped frame 1 is provided a folding foot rest 31 pivoted by means of its side members to the sides 2 of the frame 1. Links 32 are pivoted at their forward ends to the under side of the footrest 31 whilst their rearward ends engage over projecting pins 33, in the lower ends of the side 2 of the bridge shaped frame 1.

A wire guard 34 is provided on these links 32 to hold them in engagement with the pins 33 and recesses in the ends of the links engage with the pins 33 to locate the foot rest 31 on the raised position as shown in Figure 2 when it is required for use. When the push car is to be folded the foot rest 31 is folded down within the bridge shaped frame 1, by releasing the recess in the ends of the links 32, from the pins 33 when the foot rest will be free to turn about its pivotal connection with the sides 2 of the frame 1.

Suitable straps 35 are provided so as to secure the parts together when the push car is folded up for carrying as indicated in Figure 4. The flexible material 16 forming the back of the chair of the push car is provided with a slot 36, through which a handle 37 on the bridge shaped frame 1 will project when the push car is folded and will afford a ready means for carrying the folded push car as will be seen from Figure 4. The push car when folded assumes a very compact form, all the side members lying flat upon the sides of the bridge shaped frame 1. The wheels fold over within the frame 1 and are covered and enclosed by the leather or other flexible material forming the back and seat of the push car.

I do not wish to restrict myself to any particular construction of seat or body which may be modified to suit various uses and may be made to act as a bassinette or other form of carriage.

I claim:—

1. A folding push car comprising a bridge-like frame, a pair of brackets mounted so as to rotate in bearings on each side of said frame, wheels carried by each of said brackets so as to permit the same to fold into said frame, a pair of side members pivoted to said frame so as support a folding back, a second pair of side members also pivoted to said frame and adapted to support a seat and arms, means for securing said back, seat and arms in erected position on said frame, and means for securing said wheels and their supporting brackets in their extended position.

2. A folding push car comprising a bridge-like frame, wheel supporting members mounted so as to rotate about substantially vertical axes on each side of said frame, wheels rotatable on said members, a pair of side members pivotally connected to said frame and adapted to support a folding back, a second pair of side members pivotally connected to said frame and adapted to support a seat and a pair of arm rests, means for connecting the free end of said seat and arms to said first mentioned pair of side members, and folding back respectively, and means for permitting each pair of side members, the folding back, seat and arm rests to be folded back, to enclose said frame and wheels between them.

3. A folding push car comprising a bridge-like frame, brackets mounted so as to rotate about upright pivots on each side of said frame, wheels on each of said brackets adapted to be folded into said frame, side members pivotally connected to said frame adapted to support a folding back, a seat and arm rest, a foot rest pivotally connected to said frame, means for supporting said foot rest in its functioning position with respect to said frame, means for securing said back, seat and arm rests in functioning position and means permitting said brackets and wheels to be folded into said frame, and said back, seat and arm rests to be folded to a position to enclose said frame between them.

4. A folding push car comprising a bridge-like frame, a pair of brackets on each side of said frame supported in upright bearings thereon, a wheel on each of said brackets adapted to be folded inwardly so as to be enclosed by said frame when the car is collapsed and to be moved to a position fore and aft of said frame, side members pivoted to said frame adapted to support a folding back, seat and arms, means for securing said arms, back and seat in functioning position with relation to said frame, and means for permitting said arms, back and seat to be folded to enclose said frame between them.

5. A folding push car comprising a bridge-like frame, brackets mounted on each side of said frame so as to rotate about substantially vertical axes, wheels supported on each of said brackets, means on the upper ends of said brackets co-acting with said frame to lock said brackets in the position for the car to be wheeled, side members pivoted to said frame adapted to support a folding back, seat and arms, means for securing said back, seat and arms, in erected position on said frame, and means permitting said seat, back and arms to be folded to enclose said frame between them.

6. A folding push car comprising a bridge-like frame, brackets mounted on each side of said frame so as to rotate about substantially vertical axes, means for locking said brackets in functioning position, wheels on each of said brackets, a pair of side members pivoted to said frame, a second pair of side members pivoted to said frame, said pairs of side members projecting upwardly in diverging directions, a folding back pivotally connected to the back pair of said side members, a pair of arm rests hinged towards the upper ends of the front pair of side members, a hinged seat connected to one pair of said side members, and means for clamping said seat to the other pair of side members so as to secure the frame in functioning position.

7. A folding push car comprising a bridge-like frame, brackets mounted on each side of said frame so as to rotate about substantially vertical axes, means for locking said brackets in functioning position, wheels on each of said brackets, a pair of side members, pivoted to said frame, a second pair of side members pivoted to said frame, a stop on each side of said frame against the opposite sides of which the side members engage, a folding back pivotally connected to one pair of side members, a pair of arm rests pivotally connected to the other pair of side members, a seat pivotally connected to one pair of side members, and means for clamping the free end of said seat to the other pair of side members so as to secure said frame in erected position.

8. A folding push car comprising a bridge-like frame, a pair of brackets mounted so as to rotate in bearings on each side of said frame, wheels carried by each of said brackets so as to permit the same to fold into said frame, a pair of side members pivoted to said frame so as to support a folding back, a second pair of side members also pivoted to said frame, a pair of arm rests pivotally connected towards the upper end of said second pair of side members, each of said arm rests being of channelled section, an elastic connection attached at one end to the folding back and at the other end to said arm rests near their pivots, a seat pivotally connected to either pair of said side members, means for securing said back, seat and arms in erected position upon said frame, and means for securing said wheels and supporting brackets in their extended position.

9. A folding push car comprising a bridge-like frame, a pair of brackets mounted on as to rotate in bearings on each side of said frame, wheels carried by each of said brackets so as to permit the same to fold into said frame, a pair of side members pivoted to said frame so as to support a folding back, a second pair of side members also pivoted to said frame, a pair of arm rests pivotally connected to one end to the upper ends of said second pair of side members, abutments on each side of the folding back against which the free ends of the arm rests engage, a seat pivotally connected at one end to either pair of said side members, clamping means for securing the free end of said seat to the other pair of said side members, and means for securing said wheels and their supporting brackets in their extended position.

10. A folding push car comprising a bridge-like frame, brackets mounted on each side of said frame so as to rotate about substantially vertical axes, wheels carried by each of said brackets, means for securing said brackets in their extended position, a pair of side members pivotally connected to said bracket and adapted to support a folding back, a second pair of side members pivoted to said frame, a pair of arm rests pivotally connected to the upper ends of said second pair of side members, a seat having side strips pivotally connected at one end, to either pair of side members and provided with lugs on the other ends, locking means mounted on said lugs, lugs on the other pair of side members with which said locking means are brought into engagement said locking means being arranged to clamp the whole frame of the push car in the open position.

11. A folding push car comprising a bridge-like frame, brackets mounted on each side of said frame, so as to rotate about substantially vertical axes, wheels carried by each of said brackets, side members pivotally connected to said frame and adapted to support a folding back, a seat and a pair of arm rests, said back and seat having a covering adapted when said back, seat and arm rests are folded to enclose said frame between them to form a covering for the whole frame, and means on said frame for securing the parts in the folded and collapsed position and for carrying the push car.

GEORGE THOMAS.